US011964186B2

(12) United States Patent
Cotie et al.

(10) Patent No.: US 11,964,186 B2
(45) Date of Patent: Apr. 23, 2024

(54) RESISTANCE DEVICE AND METHOD

(71) Applicant: Wanda Jessie Cotie, Gatineau (CA)

(72) Inventors: Wanda Jessie Cotie, Gatineau (CA); Michel Pennington, Gatineau (CA)

( * ) Notice: Subject to any disclaimer, the term of this patent is extended or adjusted under 35 U.S.C. 154(b) by 463 days.

(21) Appl. No.: 17/614,452

(22) PCT Filed: Jun. 25, 2020

(86) PCT No.: PCT/CA2020/050878
§ 371 (c)(1),
(2) Date: Nov. 26, 2021

(87) PCT Pub. No.: WO2020/257929
PCT Pub. Date: Dec. 30, 2020

(65) Prior Publication Data

US 2022/0203162 A1 Jun. 30, 2022

Related U.S. Application Data

(60) Provisional application No. 62/866,274, filed on Jun. 25, 2019.

(51) Int. Cl.
*A63B 23/20* (2006.01)
*A61H 19/00* (2006.01)
(Continued)

(52) U.S. Cl.
CPC ............. *A63B 23/20* (2013.01); *A61H 19/34* (2013.01); *A61H 19/44* (2013.01);
(Continued)

(58) Field of Classification Search
CPC .............. A63B 23/20; A63B 21/00196; A63B 2024/0065; A63B 2225/50; A61H 19/34;
(Continued)

(56) References Cited

U.S. PATENT DOCUMENTS 4,241,912 A * 12/1980 Mercer .................. A63B 23/20
606/191
5,782,745 A 7/1998 Benderev
(Continued)

FOREIGN PATENT DOCUMENTS

AU 7205698 A * 11/1998 ............... A61F 5/48
CH 700136 A2 * 6/2010 ............. A63B 23/20
(Continued)

OTHER PUBLICATIONS

English translation for CN 109260001, translated on Jun. 21, 2022, translated by SEARCH engine and clarivate analytics.*
(Continued)

*Primary Examiner* — Tu A Vo
(74) *Attorney, Agent, or Firm* — Eugene Derenyi

(57) ABSTRACT

Disclosed herein is a resistive device for insertion into a perineal orifice, such as anus or vagina, the device including: an operative portion for insertion into the perineal orifice, the operative portion including a plurality of bowed, resilient fins having proximal and distal ends, and a tip connected to the plurality of fins at the proximal ends for insertion into the perineal orifice. The resistive device also includes a base connected to the plurality of fins at the distal ends. A method of use is disclosed for inter alia exercising the Kegel muscles using the resistive device.

21 Claims, 15 Drawing Sheets

(51) Int. Cl.
*A63B 21/00* (2006.01)
*A63B 24/00* (2006.01)

(52) U.S. Cl.
CPC *A63B 21/00196* (2013.01); *A63B 2024/0065* (2013.01); *A63B 2225/50* (2013.01)

(58) Field of Classification Search
CPC ........ A61H 19/44; A61H 19/40; A61H 19/00; A61H 21/00
See application file for complete search history.

(56) References Cited

U.S. PATENT DOCUMENTS

| | | | | |
|---|---|---|---|---|
| 6,224,525 | B1 * | 5/2001 | Stein | A63B 21/026 482/121 |
| 7,497,816 | B2 * | 3/2009 | Li | A63B 23/20 600/38 |
| 8,360,954 | B2 | 1/2013 | Kim | |
| 9,095,744 | B2 | 8/2015 | Horsley | |
| 9,844,486 | B2 | 12/2017 | Lee | |
| 10,483,784 | B2 | 11/2019 | Konik et al. | |
| 10,945,652 | B1 * | 3/2021 | Wanderman | A61B 5/227 |
| 11,045,246 | B1 * | 6/2021 | Schwartz | A61F 5/4553 |
| 11,207,562 | B2 * | 12/2021 | Yuan | A63B 71/0622 |
| 11,324,999 | B2 * | 5/2022 | Siegel | A63B 21/00189 |
| 2002/0142902 | A1 * | 10/2002 | Stein | A63B 23/20 482/121 |
| 2002/0169056 | A1 * | 11/2002 | Ross | A63B 23/20 482/121 |
| 2009/0111671 | A1 * | 4/2009 | Campbell | A61M 25/10 604/509 |
| 2012/0053017 | A1 * | 3/2012 | Kushnir | A63B 23/20 482/121 |
| 2014/0155225 | A1 * | 6/2014 | Sedic | A63B 24/0062 482/8 |
| 2015/0196802 | A1 * | 7/2015 | Siegel | A63B 24/0062 482/8 |
| 2016/0279469 | A1 * | 9/2016 | Rose | A61B 5/486 |
| 2019/0247715 | A1 * | 8/2019 | Sedic | A63B 24/0087 |
| 2019/0336260 | A1 * | 11/2019 | Price | A61F 13/20 |
| 2021/0161403 | A1 * | 6/2021 | Beer | A61B 5/1121 |

FOREIGN PATENT DOCUMENTS

| | | | | | |
|---|---|---|---|---|---|
| CN | 109173184 | A | | 1/2019 | |
| CN | 109260001 | A | * | 1/2019 | |
| DE | 10226833 | A1 | | 1/2004 | |
| WO | WO-0137732 | A1 | * | 5/2001 | A61B 5/22 |
| WO | WO-2004037352 | A1 | * | 5/2004 | A61B 5/227 |
| WO | WO-2017070787 | A1 | * | 5/2017 | |

OTHER PUBLICATIONS

English translation for CH 700 136, translated on Jun. 21, 2022, translated by SEARCH engine and clarivate analytics.*
International Search Report, dated Sep. 30, 2020, in International application No. PCT/CA2020/050878, filed on Jun. 25, 2020.
Written Opinion Report, dated Sep. 30, 2020, in International application No. PCT/CA2020/050878, filed on Jun. 25, 2020.

* cited by examiner

RESISTANCE DEVICE AND METHOD

CROSS-REFERENCE TO RELATED APPLICATIONS

The present application is related to, and claims convention priority from, U.S. Provisional Patent Application No. 62/866,274, filed 25 Jun. 2019, for "RESISTANCE DEVICE AND METHOD" by Wanda Jessie Cotie et Al.

TECHNICAL FIELD

The present application relates to the field of exercise and resistance apparati and, in particular, muscular strengtheners for the Kegel muscles and other related muscles of the pelvic floor.

BACKGROUND

Kegel muscles are very important for maintenance of bladder control. They are located in the lower abdomen/groin area, around the urethra. Accordingly, if the Kegel muscles are not strong, the urethra may leak throughout the day particularly when the individual is performing strenuous tasks.

Leaking urination is commonly reported as a result of having a baby. Some studies support the conclusion that 98% of women who have children develop a pelvic floor dysfunction. When a baby passes through the birth canal, it may stretch the connective tissues and muscles, including the Kegel muscles, such that they are no longer able to provide the pressure on the urethra that is required to prevent leakage.

Kegel exercise, also known as pelvic floor exercise, consists of repeatedly contracting and relaxing the muscles that form part of the pelvic floor, now sometimes colloquially referred to as the "Kegel muscles". The exercise can be performed multiple times each day, for several minutes at a time, for one to three months, to begin to have an effect. Kegel exercises can make the pelvic floor muscles stronger. These are the muscles that hold up the bladder and help keep it from leaking. Exercises are usually done to reduce urinary stress incontinence (especially after childbirth) and reduce premature ejaculation in men.

Several tools may exist to help with these exercises, although various studies may debate the relative effectiveness of different tools versus traditional exercises. They were first described in 1948 by American gynaecologist Arnold Kegel.

The aim of Kegel exercises is to improve muscle tone by strengthening the pubococcygeus muscles of the pelvic floor. Kegel is a popular prescribed exercise for pregnant women to prepare the pelvic floor for physiological stresses of the later stages of pregnancy and childbirth. Kegel exercises are said to be good for treating vaginal prolapse and preventing uterine prolapse in women and for treating prostate pain and swelling resulting from benign prostatic hyperplasia (BPH) and prostatitis in men. Kegel exercises may be beneficial in treating urinary incontinence in both men and women. Kegel exercises may also increase sexual gratification. The many actions performed by Kegel muscles include holding in urine and avoiding defecation. Reproducing this type of muscle action can strengthen the Kegel muscles. The action of slowing or stopping the flow of urine may be used as a test of correct pelvic floor exercise technique.

It is now known that the components of levator ani (the pelvic diaphragm: pubococcygeus, puborectalis and ileococcygeus muscles) contract and relax as one muscle. Hence, pelvic floor exercises involve the entire levator ani rather than pubococcygeus alone. Pelvic floor exercises may be of benefit in cases of fecal incontinence and pelvic organ prolapse conditions e.g. rectal prolapse.

SUMMARY

According to a broad general aspect of the present application, there are provided techniques to aid Kegel exercises, to provide resistance in a safe way for the user, who may then benefit from enhanced Kegel muscle strength for either treating urinary incontinence in both men and women or to increase sexual gratification. As used in the present description and in the appended claims, perineal orifice is meant to mean the vagina in the female urogenital region or the anus in the female or male posterior regions. When one of the term vagina, anus, or perineal orifice is used it is contemplated by the inventor to use the other two terms in alternative embodiments.

One general aspect includes a resistive device for insertion into a perineal orifice, the device including: an operative portion for insertion into the perineal orifice; the operative portion including a plurality of bowed, resilient fins having proximal and distal ends; and a tip connected to the plurality of fins at the proximal ends for insertion into the perineal orifice. The resistive device also includes a base connected to the plurality of fins at the distal ends. Other embodiments of this aspect include corresponding computer systems, apparatus, and computer programs recorded on one or more computer storage devices, each configured to perform the actions of the methods.

Implementations may include one or more of the following features. The device further including a handle having an inside and an outside, the inside connected to the base of the operative portion. The device where the handle is generally cylindrical. The device where the handle is flared at a distal end. The device where the proximal ends of the plurality of fins are integral to the inside of the handle. The device where at least one of the tip or the base is conical. The device where one or more of the plurality of fins have one or more apertures therein. The device where every other fin has apertures. The device where one or more of the plurality of fins has three apertures, equally spaced along their length. The device where the plurality of fins includes four fins. The device further including means of vibration comprising a vibration generator. The device further including a remote control that determines the level of vibration. The device further including bluetooth communications means for at least the remote control. The device further including a fishhook-shape dimensioned to vibrate to stimulate the prostate and/or perineum. The device further including a measurement device to see if the user is making improvements in kegel muscle strength with exercise. The device further including a small tail or extension with separate vibration for clitoral stimulation. The device further including means for removal of the operative part including at least one of a string, a loop, a hook, or an opening which will accept a finger. The device where the operative part is between 2.5 and 24 in length. A method of use of the device the method including the steps of: providing a resistive device according; inserting the resistance device into a perineal orifice. The method further including the steps of: compressing the kegel muscles; and deforming the resistance device. The method further including the step of repeating the compressing and deforming steps one or more times. The method further including the step of leaving the resistance device inserted. Implementations of the described techniques may include hardware, a method or process, or computer software on a computer-accessible medium.

Other aspects and features of the present application will become apparent to those ordinarily skilled in the art upon review of the following description of specific embodiments of a resistance device and method in conjunction with the accompanying drawing figures.

BRIEF DESCRIPTION OF THE DRAWINGS

Embodiments of the present application will now be described, by way of example only, with reference to the accompanying drawing figures, wherein like reference numerals are used in different figures to denote similar elements.

DETAILED DESCRIPTION OF THE DRAWINGS

Figure 1:
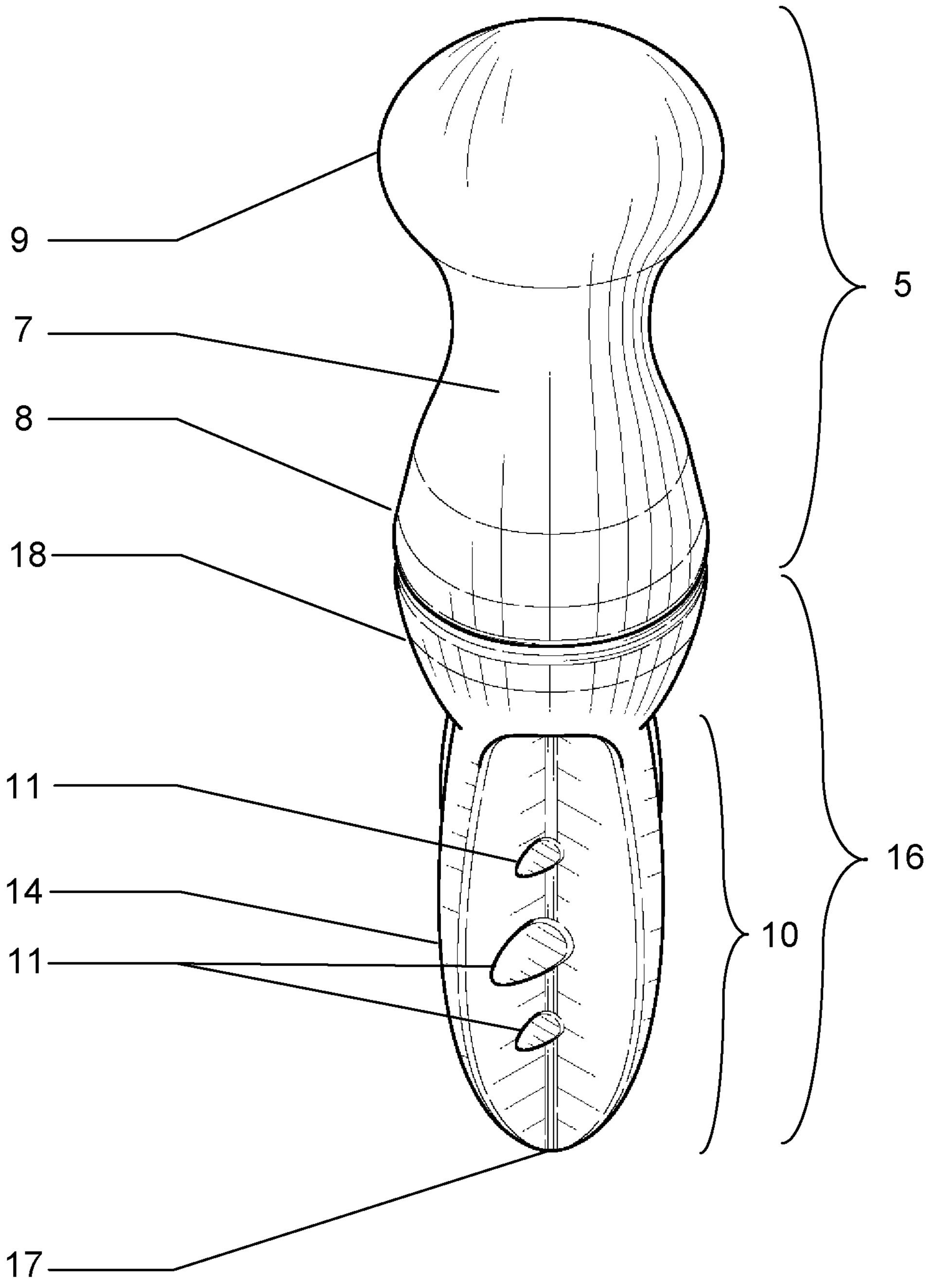
FIG. 1 is a perspective view of an embodiment of a resistance device.
Figure 2:
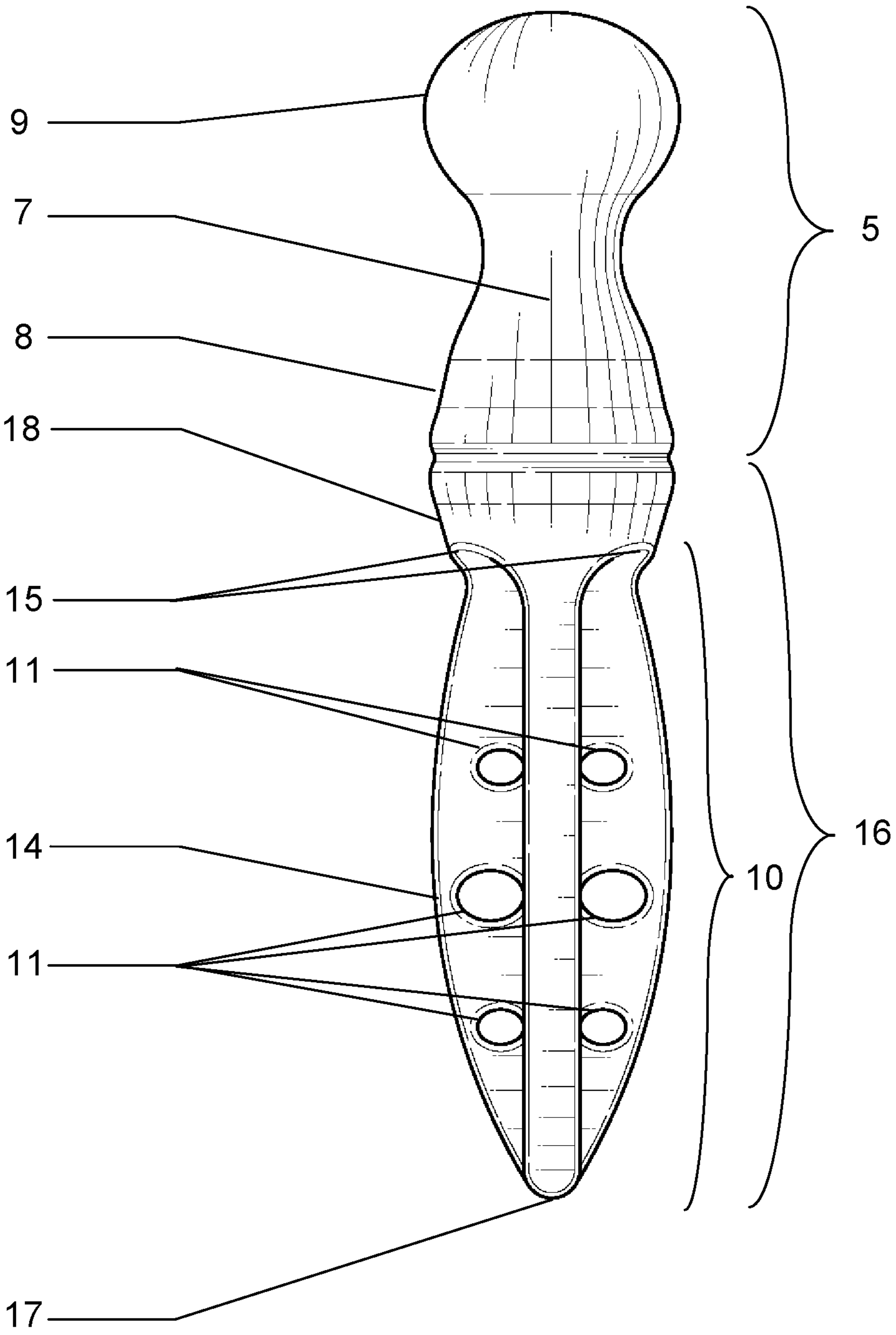
FIG. 2 is a plan view of the embodiment of a resistance device of FIG. 1.

Preferred embodiments of the present application and their advantages may be understood by referring to FIGS. 1-13 and the below description, wherein like reference numerals refer to like elements.

Referring to the drawings, FIG. 1 is a perspective view of an embodiment of a resistance device. As illustrated shown, having a handle 5, from which project a plurality of outwardly-bowed fins 10, terminating in a tapered operative part 16 having a tip 17. The handle has an inside and an outside side. The outside of the handle faces the user's hand, and coincides with the proximal side or end. The inside, or distal end, faces the inside of the user's vagina. The handle 5 is generally cylindrical and may have some grip 7 thereon, in order to provide a more substantial surface to hold. In an embodiment, the inside 8 of the handle from which the fins project, namely the distal end 9, is flared to prevent the handle 5 from slipping into a hand that is holding it. The inside end 8 has two or more fins 10 connected thereto and projecting outwardly therefrom. The fins are flexible and resilient and bowed outwardly. In a preferred embodiment, there are four fins 10. In an embodiment the fins or are moulded integrally with the handle as a single mould, or integrally with an insert that fits within the handle.

The fins 10 are preferably bowed and may be triangular, square, diamond-shaped, rectangular or ellipsoid in cross-section, with or without rounded corners. In an embodiment, the fins are equally spaced around the handle end 8 and terminate in the operative part 16 and tip 17, so that pressure on the midpoint 14 of the resistance device may be distributed between fins 10 that are adjacent to the source of the pressure. Each fin 10 is made of a resilient, flexible material, such as silicone rubber, which may be deformed on the application of a force, and returns to the original shape on removal of the force. The deformation should return to the original shape many times without breaking, and a plastic or rubber would preferably be used. As the device is for insertion into a human body, a latex-free design would avoid allergies with latex.

In an embodiment, two of the four fins 10 have apertures 11 therein, and in an embodiment the apertures 11 are circular or ovoid. There may be a plurality of apertures on each fin that has apertures, such that smaller apertures coincide with a narrower fin width near the tip 17 or the handle 5, and larger apertures 11 appear at the midpoint 14.

The operative part 16 is tapered and rounded at the tip 17 to allow for comfortable entry into a vagina. The operative part 16 is also resilient and deformable so as not to put undue pressure on the distal end of the vagina, particularly where the vaginal canal is shorter. In an embodiment, and with reference to FIG. 2, the strut tops 15 are integral to the tip 16 and moulded into the base 18 of the operative part 16. In a preferred embodiment, in combination with the operative part 16, the fins 10 form a football-shape or prolate spheroid. This provides a varying resilience profile, with a larger pressure required to deform the fin 10 when in its resting position, then, as the fin 10 deforms, the pressure for continually deforming the fin 10 is reduced.

Figure 3:
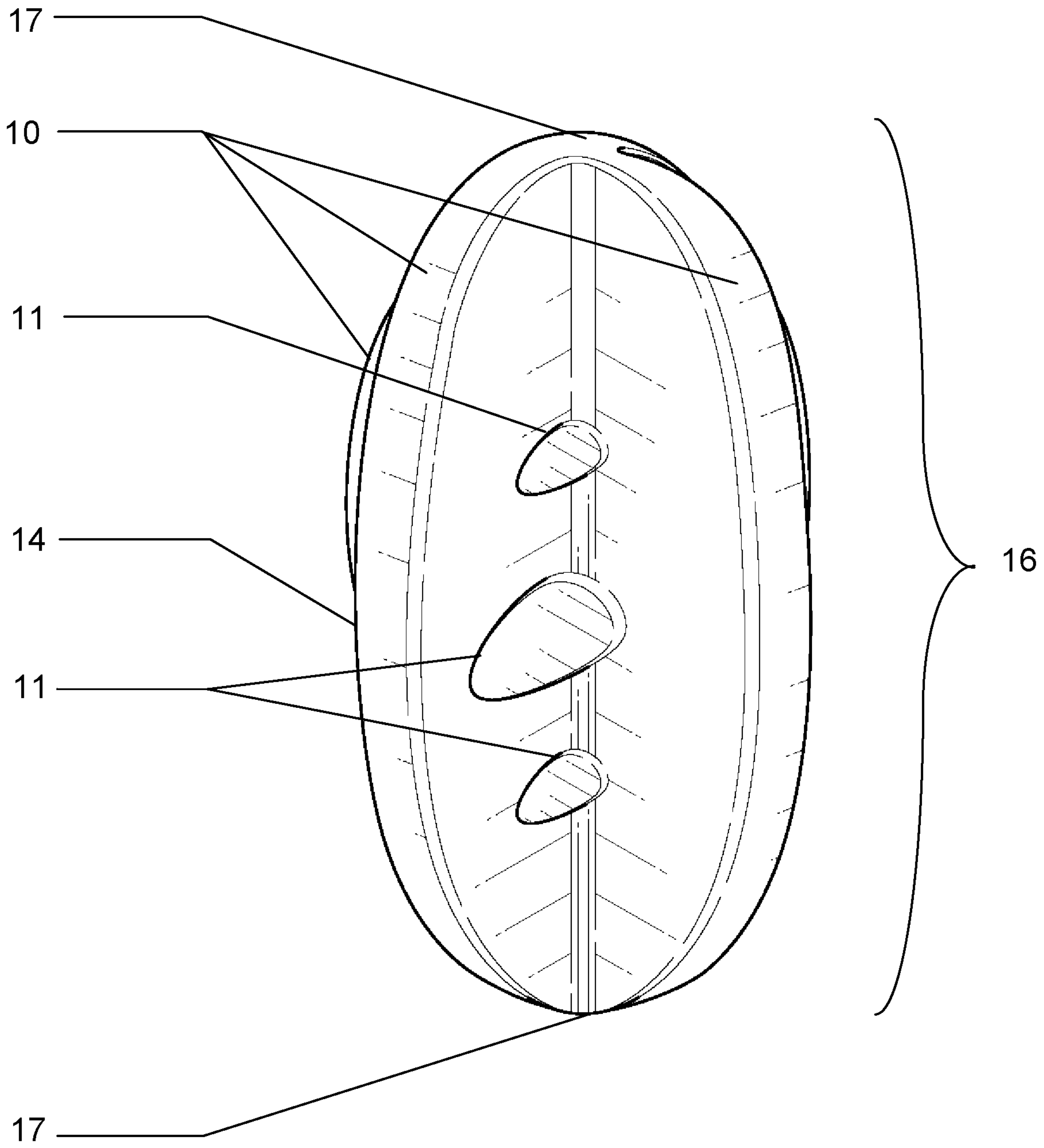
FIG. 3 is a perspective view of an embodiment of a resistance device.

FIG. 3 is a perspective view of an embodiment of a resistance device without a handle. In a preferred embodiment without a handle, in combination with the operative part 16, the fins 10 form a substantially symmetrical football-shape or prolate spheroid around the midpoint 14, advantageously providing two tips 17, one of which operates as the base 18. This provides a varying resilience profile, with a larger pressure required to deform the fin 10 when in its in a resting position, then, as the fin 10 deforms, the pressure for continually deforming the fin 10 is reduced, as well as enabling the device to be inserted at either tip 17, with the other tip acting as base 18. In an alternative embodiment without a handle, the shape of the device is not necessarily symmetrical around the midpoint 14, as will be further described with reference to FIGS. 5-17 below.

Figure 4:
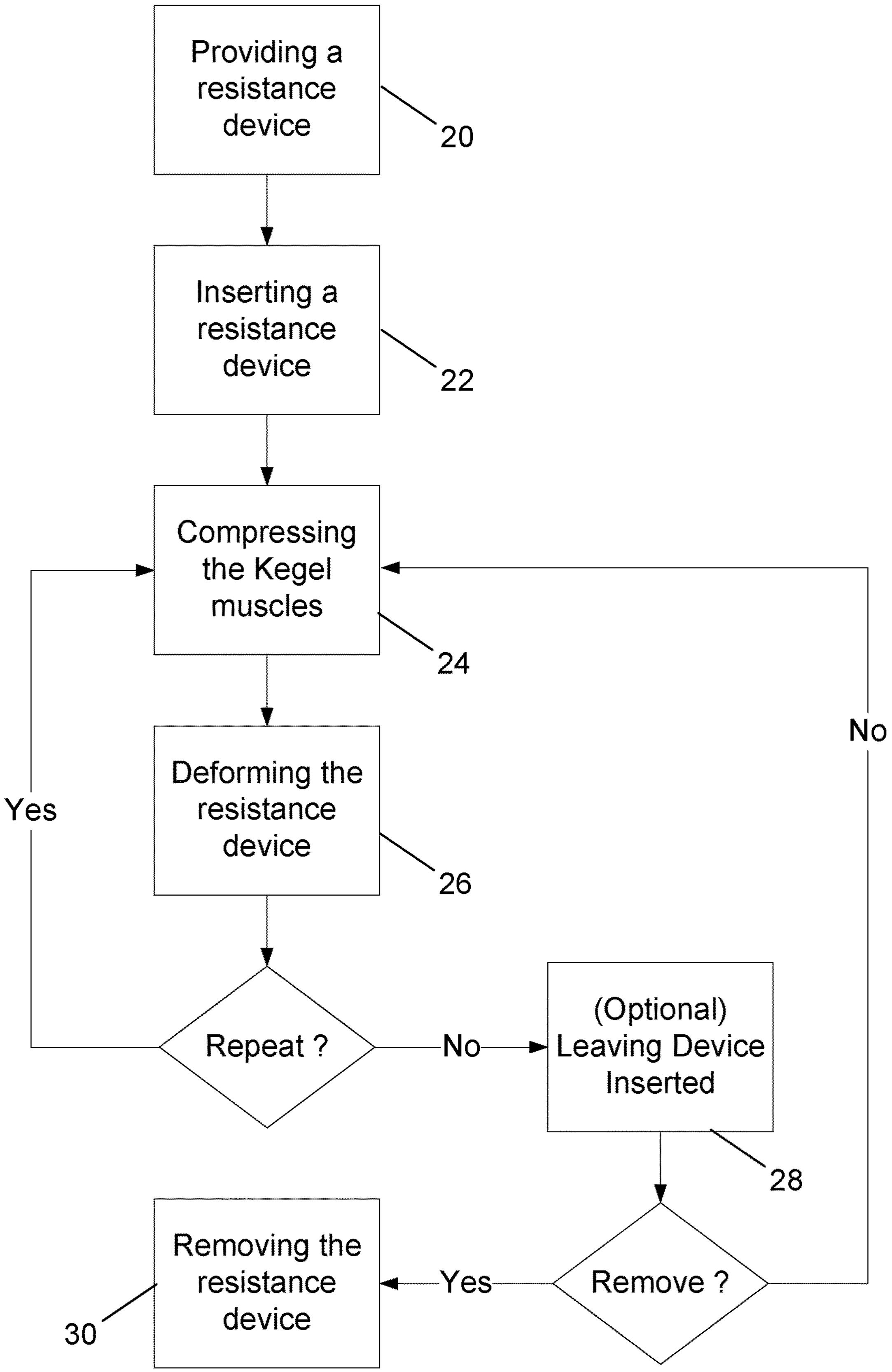
FIG. 4 is a flowchart of an embodiment of a resistance method.

FIG. 4 is a flowchart of an embodiment of a resistance method. The embodiment of the method of use of exercising the Kegel muscles (and surrounding musculature) as illustrated, includes the steps of i) providing 20 a resistance device; the resistance device having a generally conical tip and two or more outwardly curved fins; ii) inserting 22 the resistance device into a vagina of an individual; iii) the individual compressing 24 their Kegel muscles one or more times, in doing so iv) deforming 26 the fins and providing a resistance to the Kegel muscles, and v) removing 28 the resistance device from the vagina. In some embodiments of the method, such as for example if the resistance device of FIG. 3 is provided, an optional step of leaving 30 the device inserted can be performed instead of, or before the step of removing 28 the device, so that eventually the user can go back to the compressing 24 step.

The resistance device is made of a resilient, yet flexible plastic or runner, that permits deformation but, depending on the material qualities, provide greater or lesser resistance to deformation, to provide for a series of resistance devices' resistance to accommodate stronger or weaker Kegel musculature. In an embodiment, the apparatus is constructed of silicone.

Figure 5:
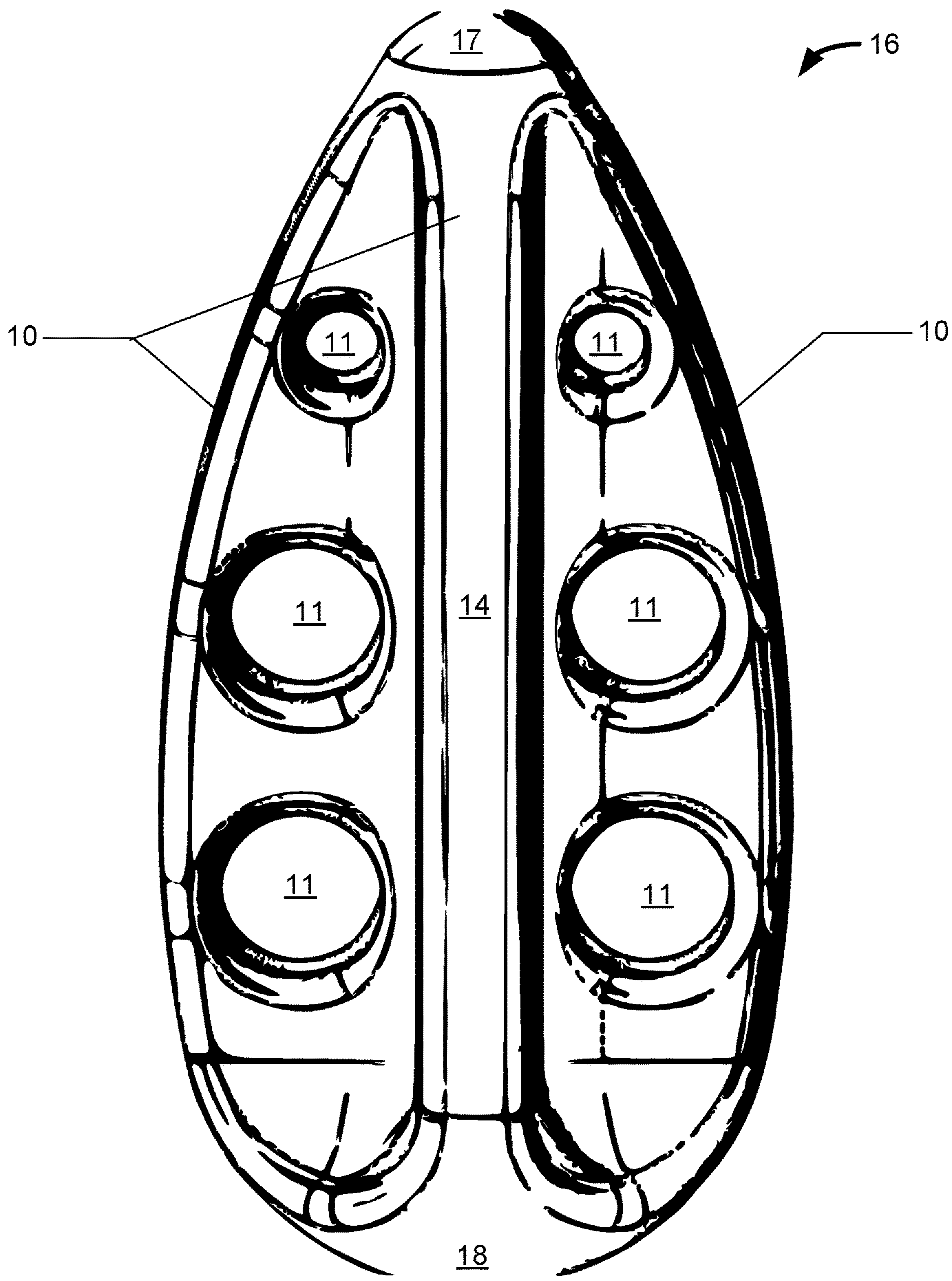
FIG. 5 is a plan view of an embodiment of a resistance device.
Figure 6:
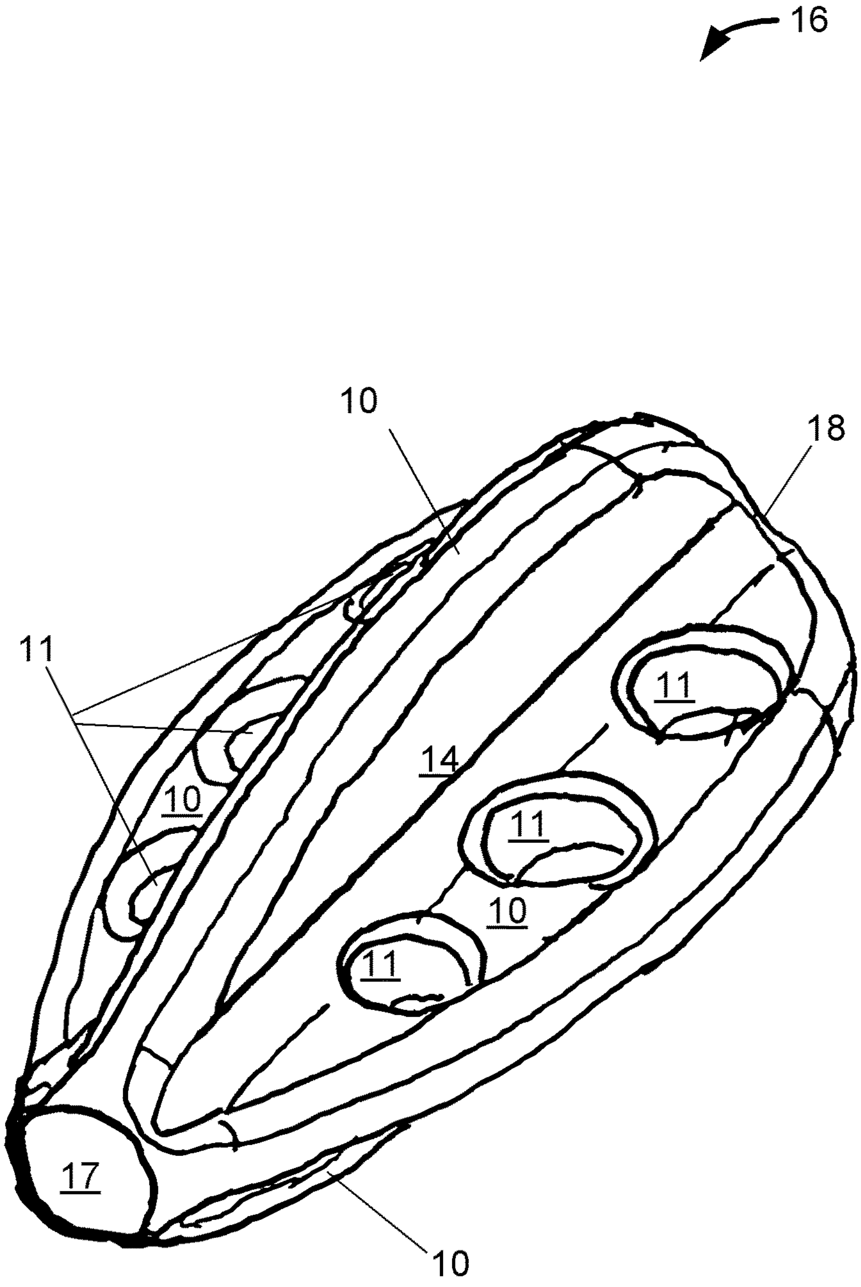
FIG. 6 is a perspective view of the embodiment of a resistance device of FIG. 5.
Figure 7:
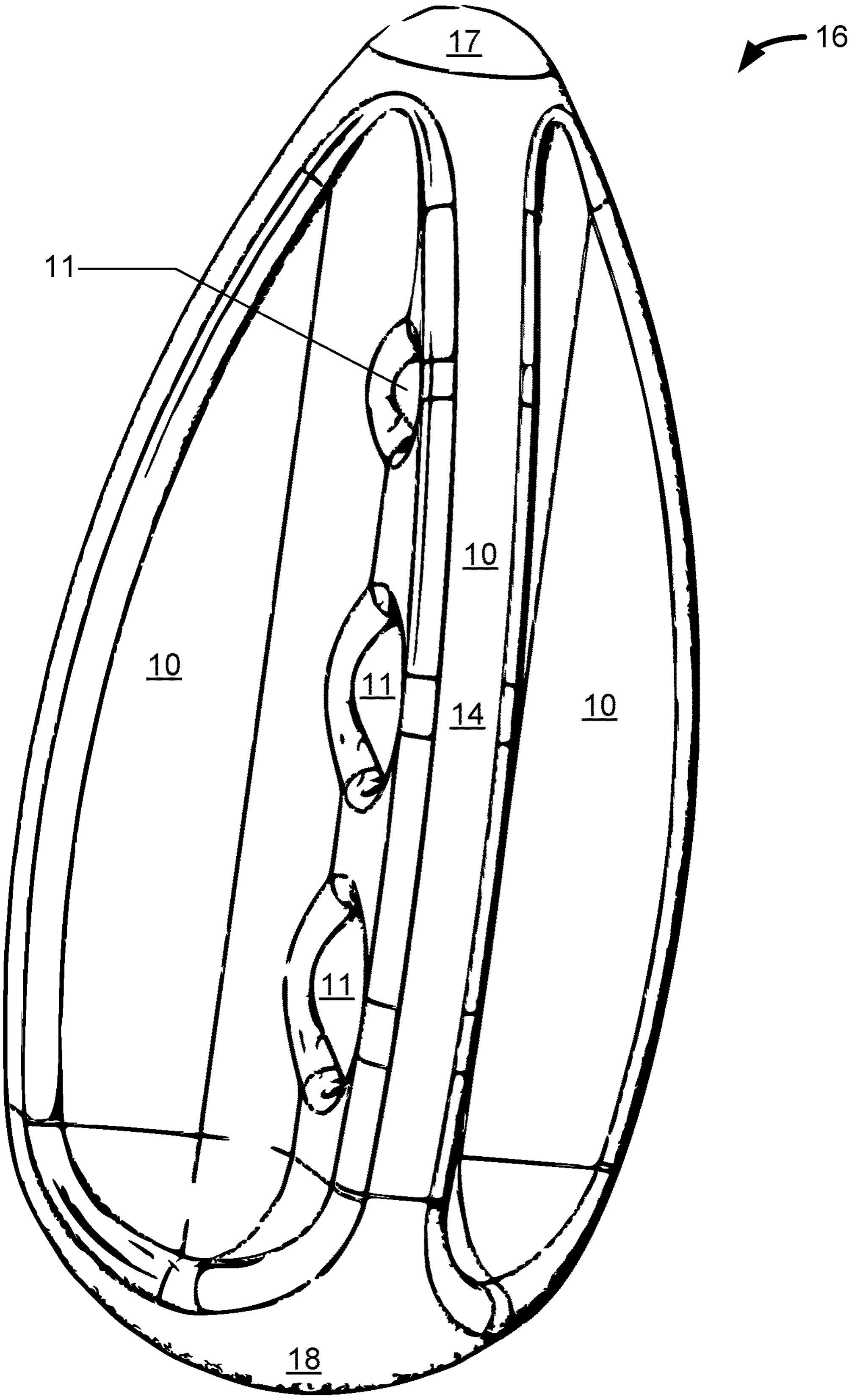
FIG. 7 is a perspective view of the embodiment of a resistance device of FIG. 5.

FIG. 5 is a plan view of an embodiment of a resistance device. FIG. 6 is a perspective view of the embodiment of a resistance device of FIG. 5. FIG. 7 is a perspective view of the embodiment of a resistance device of FIG. 5. The embodiment of FIGS. 5-7 is shown without a handle. The shape of the operative part 16 of the device is not necessarily symmetrical around the midpoint 14, with base 18 being wider than tip 17. As shown, in combination with the operative part 16, the fins 10 form an asymmetrical elongate football-shape or asymmetrical elongate prolate spheroid. This provides a varying resilience profile, with a larger pressure required to deform the fin 10 when in its resting position, then, as the fin 10 deforms, the pressure for continually deforming the fin 10 is reduced. The operative part 16 is tapered and rounded at the tip 17 to allow for comfortable entry into a vagina, and is wider at the base 18. The operative part 16 is also resilient and deformable so as not to put undue pressure on the distal end of the vagina, particularly where the vaginal canal is shorter.

Figure 8:
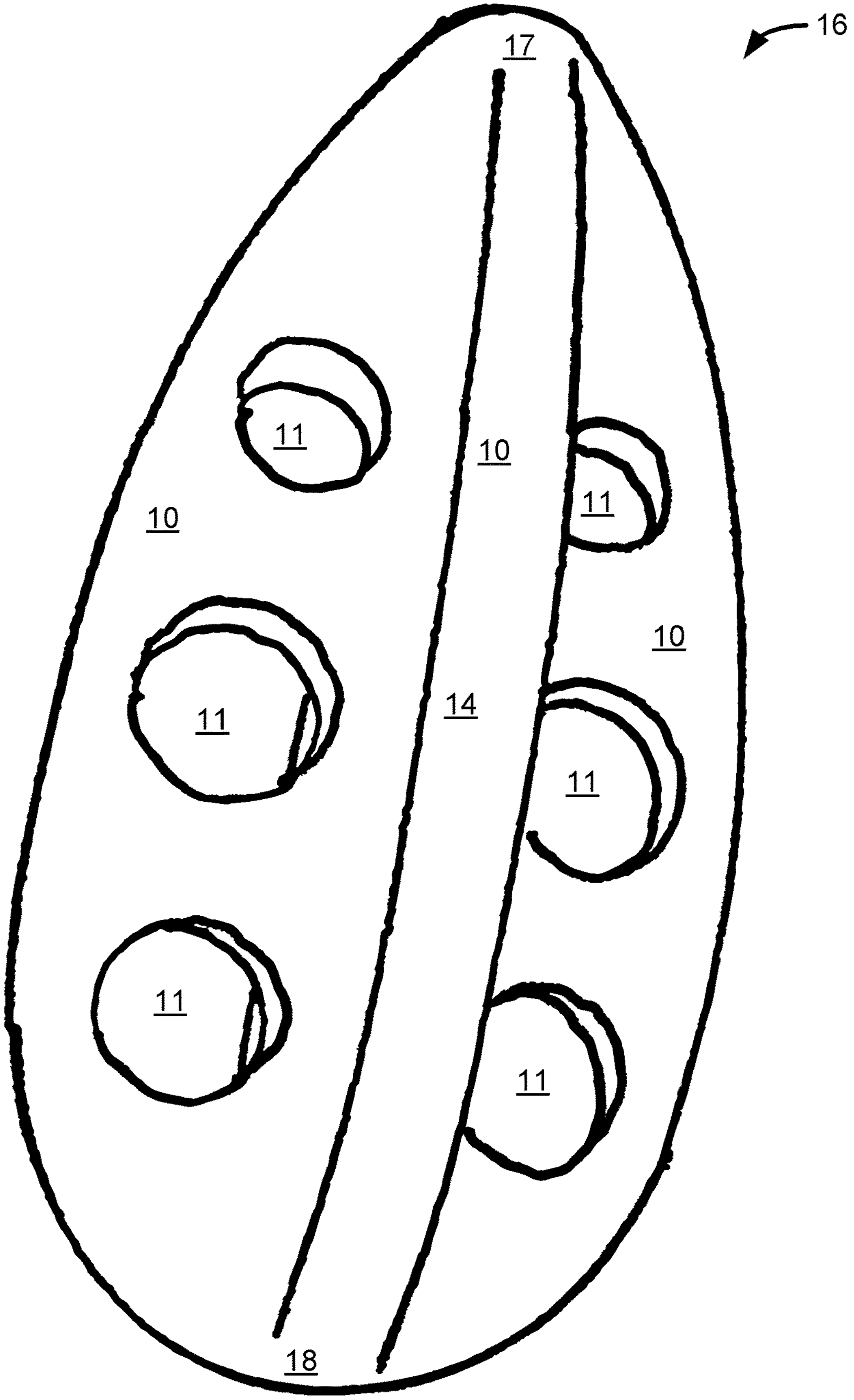
FIG. 8 is a perspective view of an embodiment of a resistance device.
Figure 9:
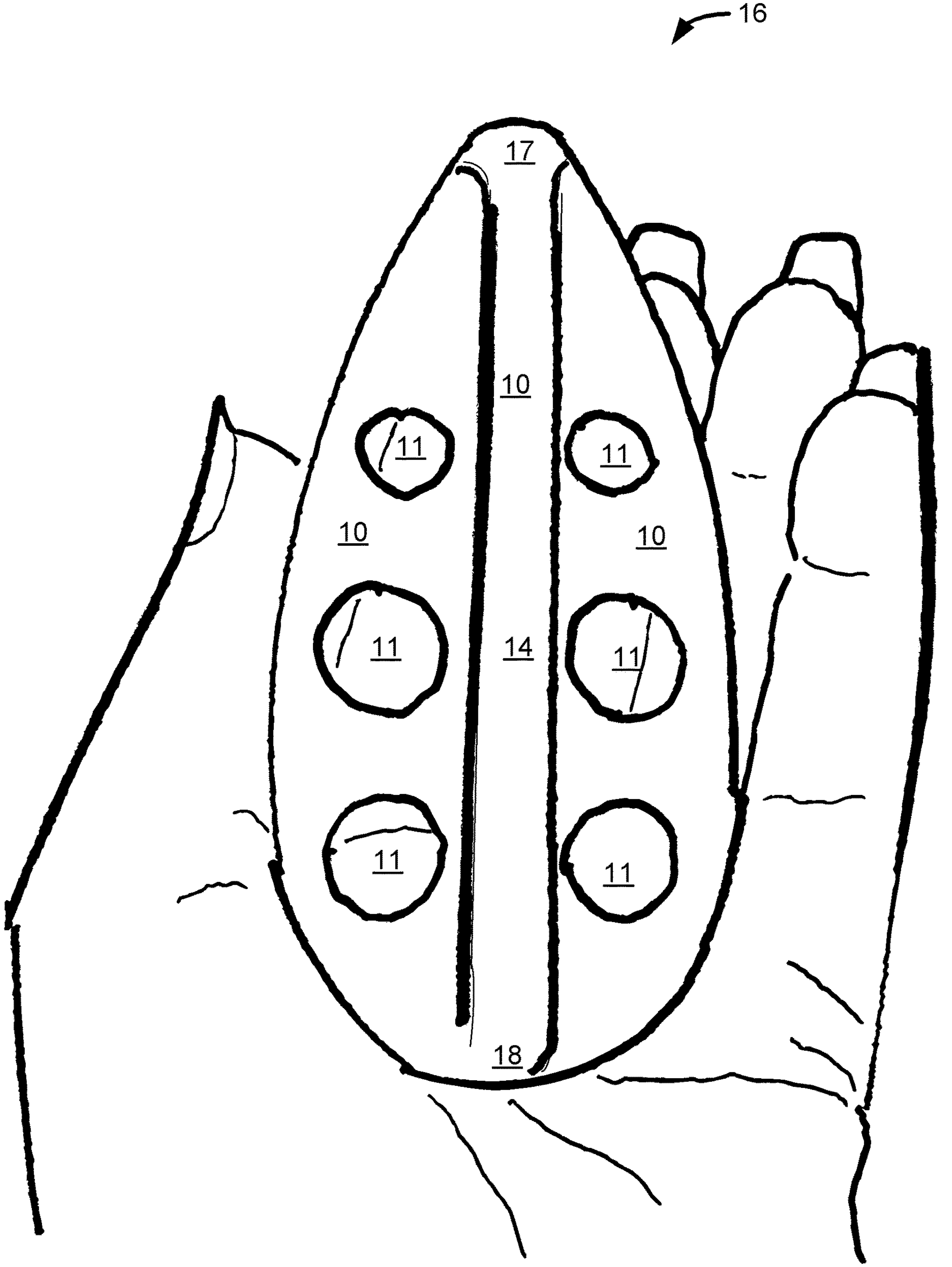
FIG. 9 is a plan view of an embodiment of a resistance device held in the palm of a hand.
Figure 10:
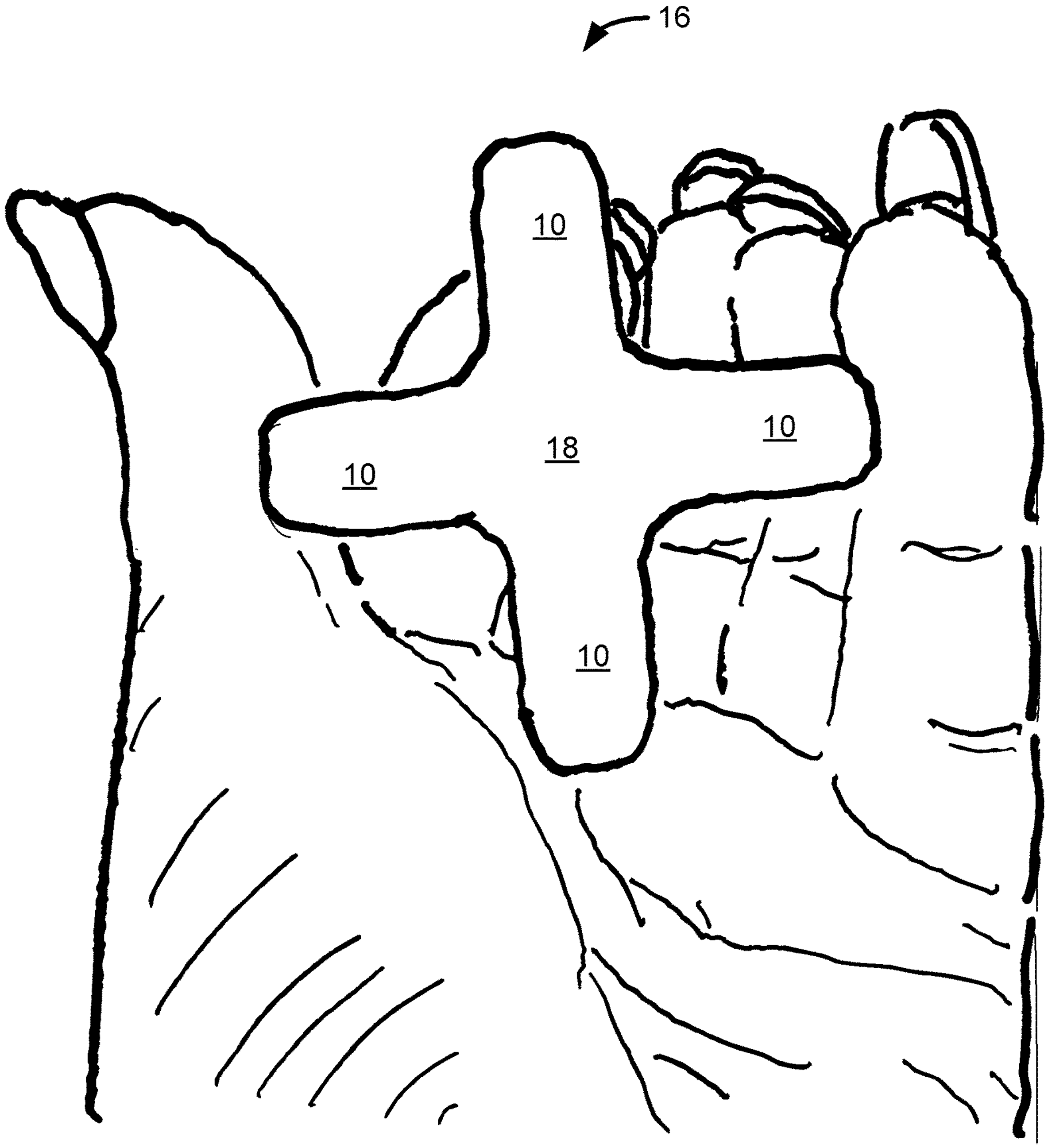
FIG. 10 is a bottom view of an embodiment of a resistance device held in the palm of a hand.
Figure 11:
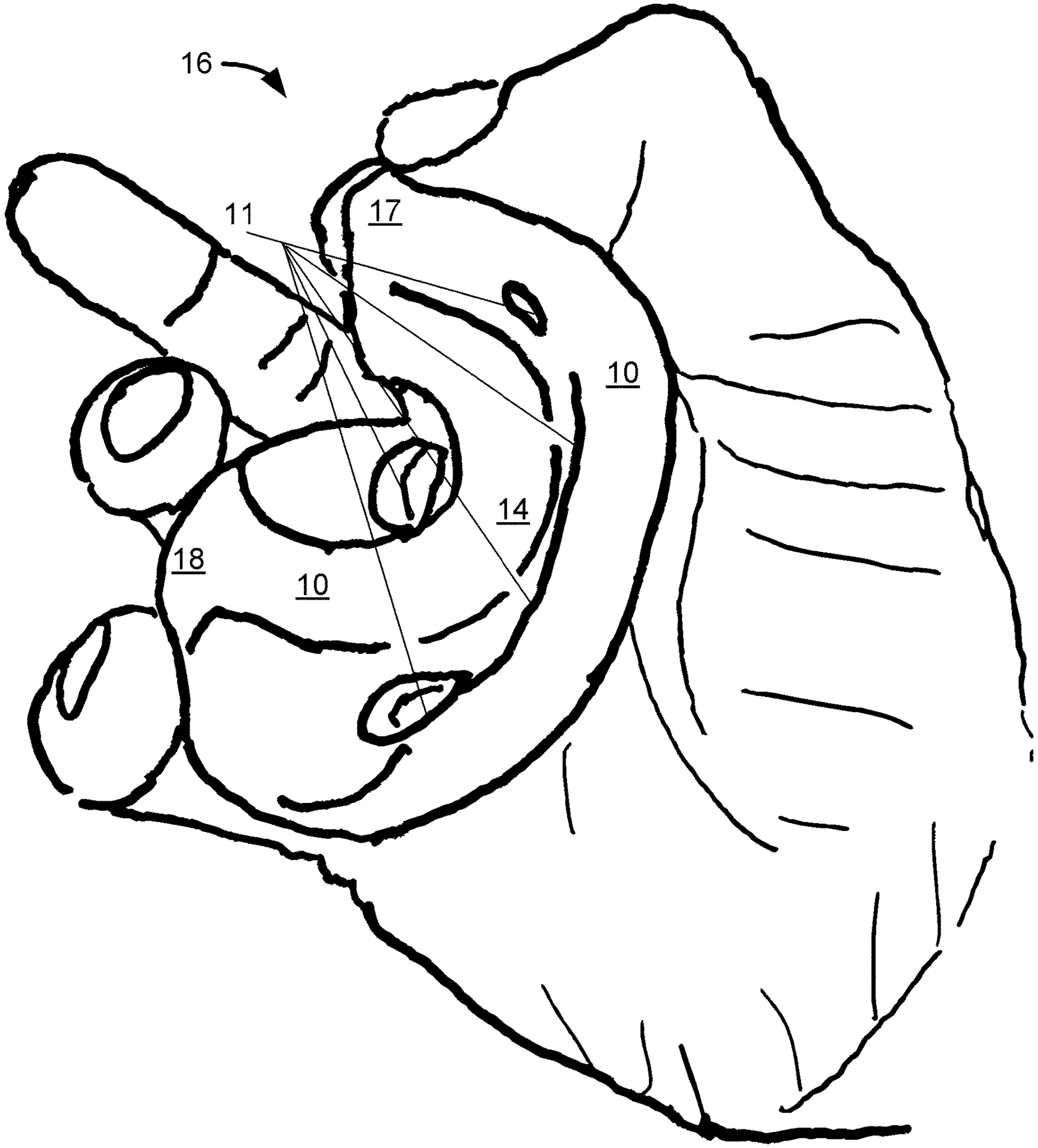
FIG. 11 is a perspective view of an embodiment of a resistance device being squeezed by a hand.

FIG. 8 is a perspective view of an embodiment of a resistance device. FIG. 9 is a plan view of an embodiment of a resistance device held in the palm of a hand. FIG. 10 is a bottom view of an embodiment of a resistance device held in the palm of a hand. FIG. 11 is a perspective view of an embodiment of a resistance device being squeezed by a hand. The operative part 16 of the resistance device is made of a resilient, yet flexible plastic or runner, that permits deformation but, depending on the material qualities, provide greater or lesser resistance to deformation, to provide for a series of resistance devices' resistance to accommodate stronger or weaker Kegel musculature. In an embodiment, the apparatus is constructed of silicone.

Figure 12:
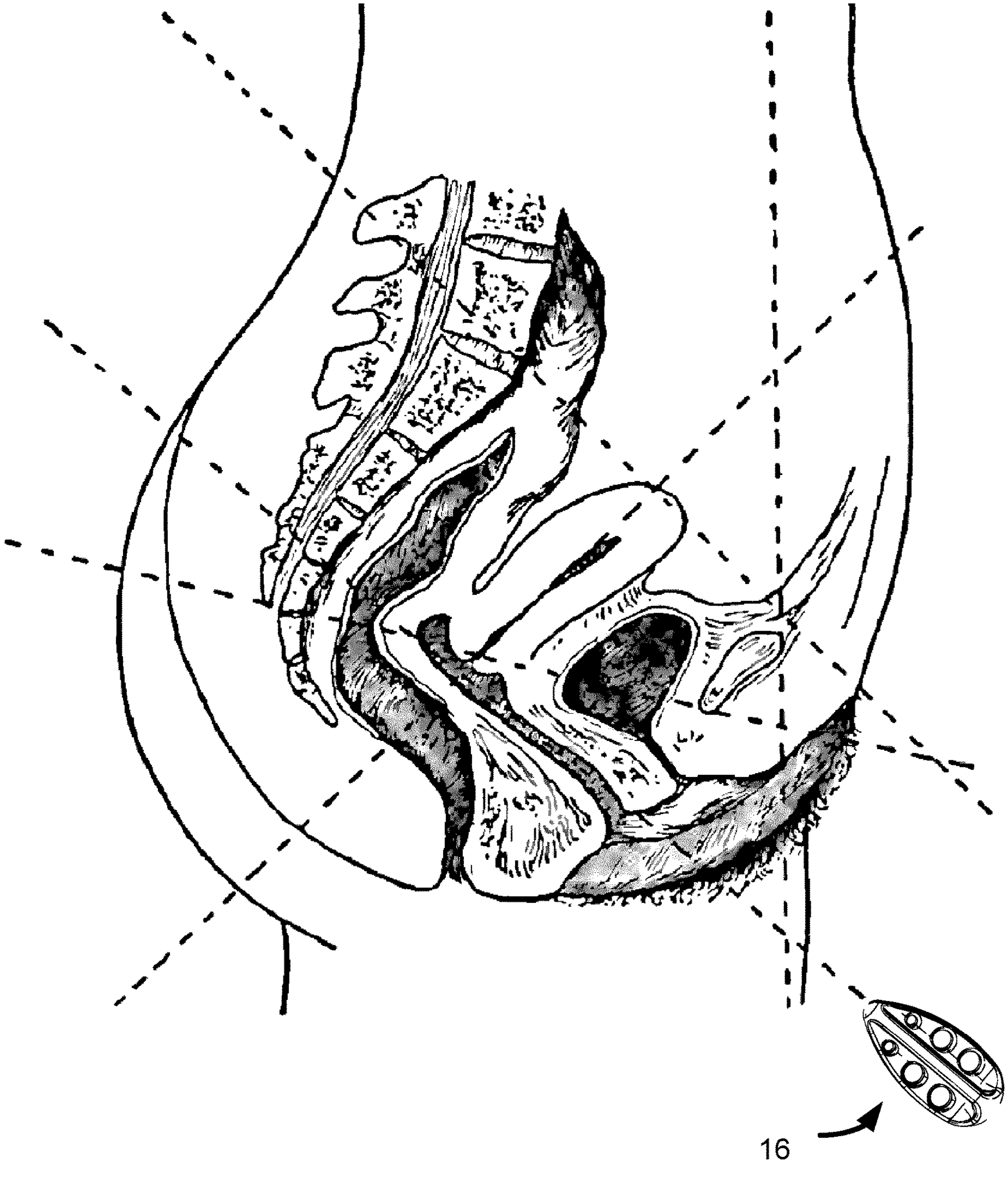
FIG. 12 is a longitudinal sagittal section view of woman in erect position, showing the various axes of the uterine and vaginal canals and pelvic brim and vaginal roof, and an embodiment of a resistance device ready to be inserted into the vaginal canal.
Figure 13:
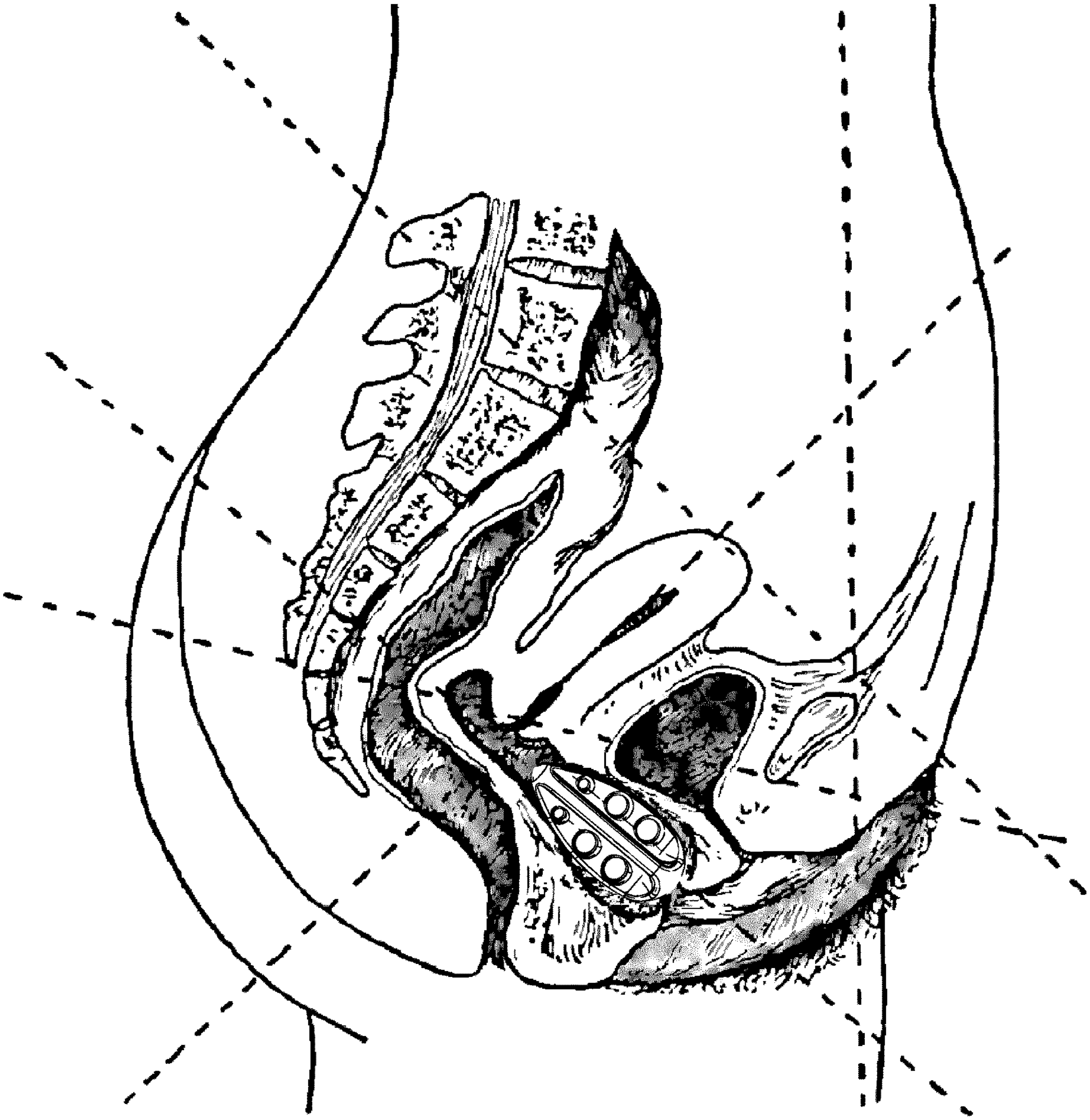
FIG. 13 is a longitudinal sagittal section view of woman in erect position, showing the various axes of the uterine and vaginal canals and pelvic brim and vaginal roof, and an embodiment of a resistance device inserted into the vaginal canal.

FIG. 12 is a longitudinal sagittal section view of woman in erect position, showing the various axes of the uterine and vaginal canals and pelvic brim and vaginal roof, and an embodiment of a resistance device ready to be inserted into the vaginal canal. FIG. 13 is a longitudinal sagittal section view of woman in erect position, showing the various axes of the uterine and vaginal canals and pelvic brim and vaginal roof, and an embodiment of a resistance device inserted into the vaginal canal. As shown, the operative part 16 of the resistance device is inserted tip 17 first into the individual user's vaginal canal so that when the individual compresses their Kegel muscles one or more times, the device offers some resistance to deformation.

Figure 14:
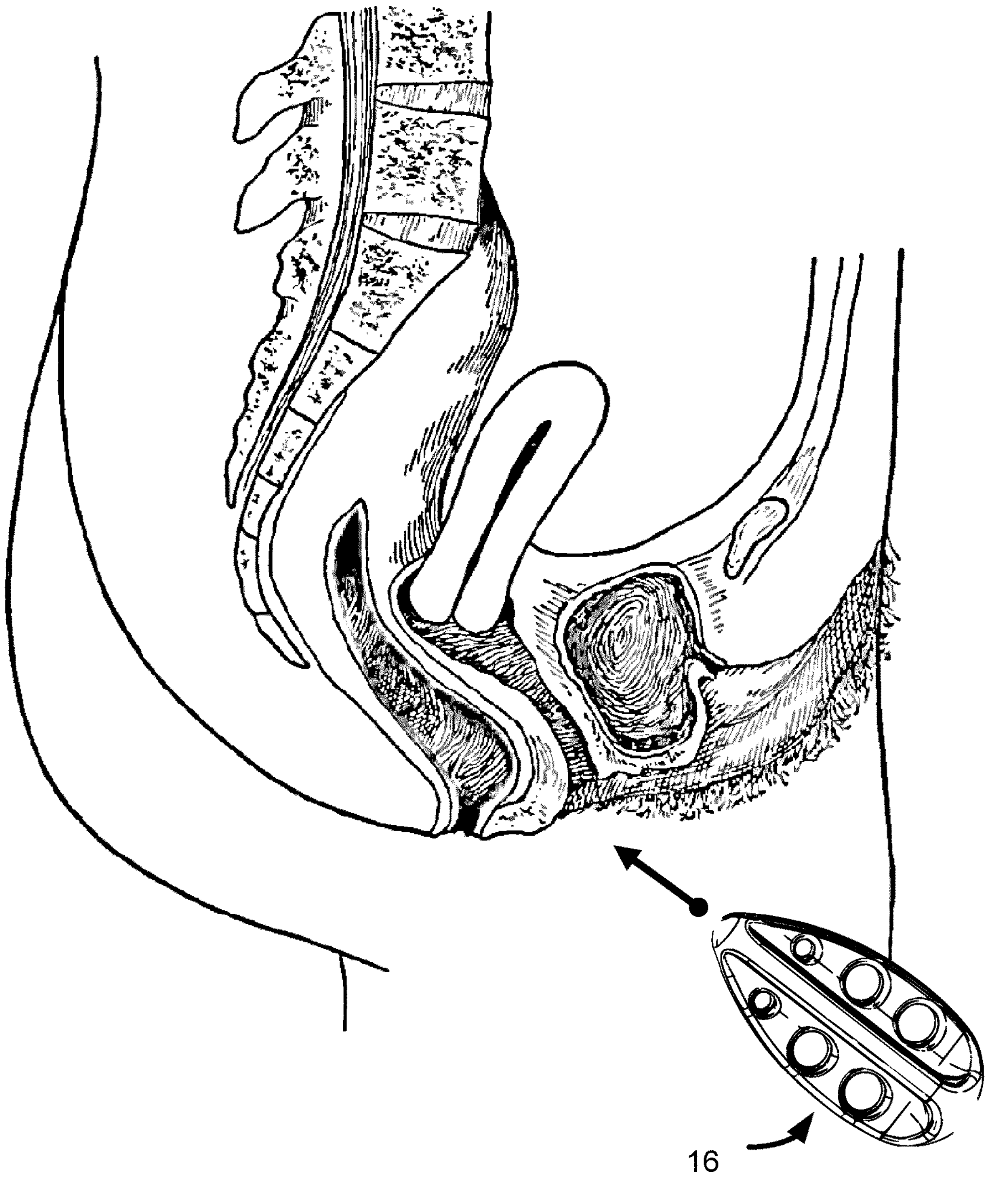
FIG. 14 is a longitudinal sagittal section view of woman in erect position, showing prolapse of anterior vaginal wall and bladder, and an embodiment of a resistance device ready to be inserted into the vaginal canal.
Figure 15:
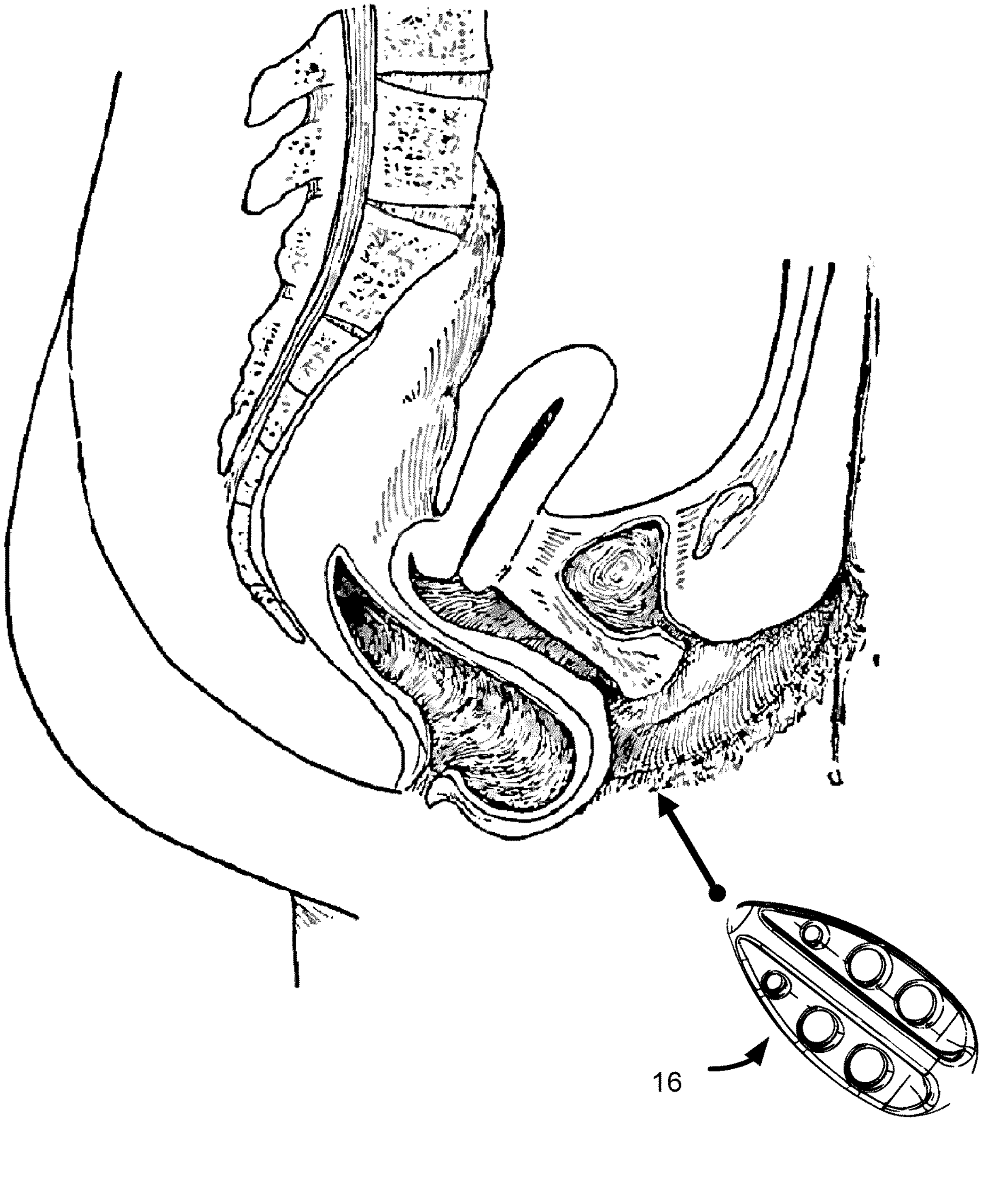
FIG. 15 is a longitudinal sagittal section view of woman in erect position, showing prolapse of posterior vaginal wall and rectum, and an embodiment of a resistance device ready to be inserted into the vaginal canal.

FIG. 14 is a longitudinal sagittal section view of woman in erect position, showing prolapse of anterior vaginal wall and bladder, and an embodiment of a resistance device ready to be inserted into the vaginal canal. FIG. 15 is a longitudinal sagittal section view of woman in erect position, showing prolapse of posterior vaginal wall and rectum, with slight rectocele, and an embodiment of a resistance device ready to be inserted into the vaginal canal. As shown, the operative part 16 of the resistance device is inserted tip 17 first into the individual user's vaginal canal so that even when the individual does not compresses their Kegel muscles, the resiliency of the device may offer some support to a prolapse of either anterior vaginal wall and bladder, posterior vaginal wall and rectum, or both.

The application has been described herein using specific embodiments for the purposes of illustration only. It will be readily apparent to one of ordinary skill in the art, however, that the principles of the application can be embodied in other ways. Therefore, the application should not be regarded as being limited in scope to the specific embodiments disclosed herein, and any such alternative embodiments are to be considered to be within the scope of the present application.

For example, without being exhaustive, the following is contemplated to be within the scope of alternative embodiments of the device of the present application. Some embodiments of a resistance device for partial or full insertion into a vagina or anus, include a plurality of bowed, resilient fins, having proximal and distal ends, the proximal ends connected to either an inside of an optional handle or from one of the two ends, and the fins projecting either from the handle; or the other of the two ends; and a tip, wherein the distal ends of the fins are connected to the tip. In some embodiments, the handle is generally cylindrical. In some embodiments, the handle is flared at a distal end. In some embodiments, the tip is conical at least at one of the distal end or the proximal end. In some embodiments the tip is rounded at least at one of the distal end or the proximal end. In some embodiments, one or more fins have one or more apertures therein. In some embodiments, the device comprises four fins, and the second and fourth fins have three apertures each, equally spaced along their length. In some embodiments, the distal ends of the fins are integral to the tip. In some embodiments, the proximal ends of the fins are integral to the inside of the handle.

For example, without being exhaustive, the following is contemplated to be within the scope of alternative embodiments of the method of the present application. Some embodiments of a method of exercising or supporting Kegel muscles, include the steps of: providing a resistive device; inserting the resistance device into a perineal orifice such as a vagina or anus; compressing the Kegel muscles one or more times; deforming the resistance device; and either removing the resistance device from the vagina or leaving the resistance device inserted.

Furthermore, without being exhaustive, although not expressly shown in the drawings, the following is contemplated to be within the scope of alternative embodiments of techniques of the present application. In some embodiments, there is provided hands free version. In some embodiments, there is provided vibration. In some embodiments, there is provided a remote control that determines the level of vibration. In some embodiments, there is provided Bluetooth™ communications for at least the remote control. In some embodiments, it is contemplated to insert the device in the anus of an individual instead of the vagina of an individual. As used in the present description and in the appended claims, perineal orifice is meant to mean the vagina in the female urogenital region or the anus in the female or male posterior regions. In some embodiments, there is provided a fishhook-shape which vibrates to stimulate the prostate and/or perineum in men. In some embodiments, there is provided a measurement device to see if the user is making improvements in Kegel muscle strength with exercise. In some embodiments, there is provided FitBit™ or the like technology to count the amount of Kegels done daily. In some embodiments, there is provided a small tail or extension with separate vibration for clitoral stimulation. In some embodiments, there is provided remote control functionality. In some embodiments, means for removal of a hands-free device are provided such as, without limitation, a string, loop, hook, or opening which will accept a finger. In some embodiments, different lengths have been contemplated, such as for example without limitation 2.5", 3.0", 3.5" for a wear alone item. In some embodiments, a line of dildos and vibrators in the same shape as embodiments of the device is provided, ranging in length from 4" to 24" and various widths. In all embodiments, creating resistance within the vagina or anus is an important design consideration.

The above-described embodiments of the present invention are intended to be examples only. Those of skill in the art may effect alterations, modifications and variations to the particular embodiments without departing from the scope of the invention, which is set forth in the claims.

What is claimed is:

1. A resistance device for insertion into a perineal orifice of a user, the device comprising:

an operative portion for insertion into the perineal orifice; the operative portion comprising:

a plurality of bowed, resilient fins having proximal ends and distal ends, wherein each of the plurality of bowed, resilient fins comprise a first surface and a second surface opposite to the first surface;

a tip connected to the plurality of fins at the proximal ends for insertion into the perineal orifice; and a base connected to the plurality of fins at the distal ends;

wherein one of the plurality of fins or each of two or more of the plurality of fins have two or more apertures therein, wherein the two or more apertures of the one of the plurality of fins or each of the two or more of the plurality of fins extend from the first surface to a second surface of each of the plurality of fins; and wherein the plurality of bowed, resilient fins, the tip, and the base are joined to each other along a middle of the operative portion extending from the base to the tip, the operative portion thereby conforming to a prolate spheroid shape thereby providing a varying resilience profile, with a larger pressure required to deform the plurality of fins when in a resting position, and as the fins deform, the pressure required for continually deforming the fins is less than the larger pressure.

2. The device of claim 1, further comprising a handle having an inside and an outside, the inside connected to the base of the operative portion.

3. The device of claim 2, wherein the handle is generally cylindrical.

4. The device of claim 2, wherein the handle is flared at a distal end of the handle.

5. The device of claim 2, wherein the proximal ends of the plurality of fins are integral to the inside of the handle.

6. The device of claim 1, wherein at least one of the tip or the base is conical.

7. The device of claim 1, wherein the plurality of fins include a first fin, a second fin adjacent to the first fin, a third fin that is adjacent to the second fin, and a fourth fin positioned between the first fin and the third fin, and only each of the first fin and the third fin comprise the two or more apertures.

8. The device of claim 1, wherein the two or more apertures comprise three apertures, the three apertures equally spaced along a length of the one of the plurality of fins or each of the two or more plurality of fins.

9. The device of claim 1, wherein the plurality of fins comprises four fins.

10. The device of claim 1, further comprising a vibration generator for generating vibration.

11. The device of claim 10, further comprising a remote control that determines a level of the vibration.

12. The device of claim 11, wherein the remote control comprises a wireless communication interface.

13. The device of claim 1, further comprising means for removal of the operative part including at least one of a string, a loop, a hook, or an opening configured to accept a finger.

14. The device of claim 1, wherein the operative part is between 2.5" and 24" in length.

15. A method of use of the device of claim 1, the method comprising the steps of:

providing the resistance device according to claim 1;

inserting the resistance device into the perineal orifice of the user.

16. The method of claim 15, further comprising the steps of: compressing pelvic floor muscles; and deforming the resistance device.

17. The method of claim 16, further comprising the step of repeating the compressing and deforming steps one or more times.

18. The method of claim 15, further comprising the step of providing a vibration generator for providing vibration.

19. The method of claim 18, further comprising the step of providing remote control for the vibration generator.

20. The device of claim 1, further comprising communication means.

21. The device of claim 20, wherein the communication means includes a wireless interface.

* * * * *